Figure 1:
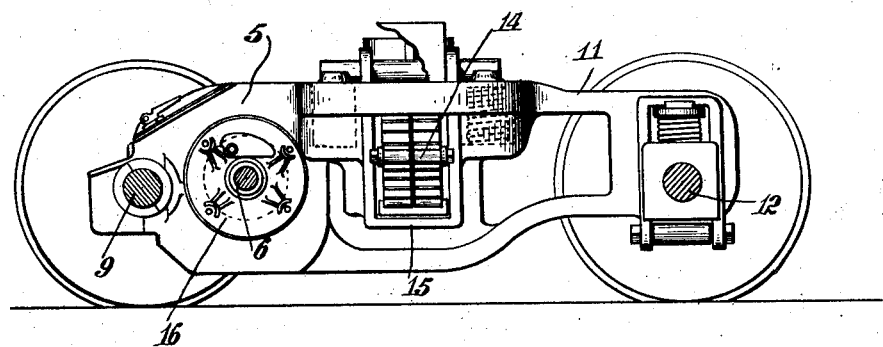

W. L. BOYER.
ELECTRIC RAILWAY TRUCK.
APPLICATION FILED JAN. 25, 1913.

1,079,389.

Patented Nov. 25, 1913.
2 SHEETS—SHEET 1.

WITNESSES

INVENTOR
Warren L. Boyer
BY George Cook
ATTORNEY

W. L. BOYER.
ELECTRIC RAILWAY TRUCK.
APPLICATION FILED JAN. 25, 1913.

1,079,389.

Patented Nov. 25, 1913.
2 SHEETS—SHEET 2.

WITNESSES

INVENTOR
Warren L. Boyer
BY
ATTORNEY

UNITED STATES PATENT OFFICE.

WARREN L. BOYER, OF KINGSTON, NEW YORK.

ELECTRIC-RAILWAY TRUCK.

1,079,389.  Specification of Letters Patent.  Patented Nov. 25, 1913.

Application filed January 25, 1913. Serial No. 744,132.

*To all whom it may concern:*

Be it known that I, WARREN L. BOYER, a citizen of the United States, and a resident of Kingston, in the county of Ulster and State of New York, have made and invented certain new and useful Improvements in Electric-Railway Trucks, of which the following is a specification.

My invention relates to trucks designed for use upon electric railways for the purpose of supporting a car body or one end thereof, and more particularly to trucks for electric railways in which two parallel axles are employed, one such truck being located at each end of the car.

Heretofore the usual practice in providing trucks for electric railway cars has been to design and build a truck frame of sufficient strength to support a car body or one end thereof, which truck frame is so designed and arranged as to support the electric motor which drives the car; the frame being thus designed with reference to supporting both the car body and the motor whereby the car is operated.

As distinguished from the above, my invention contemplates, and the object thereof is to provide a single unitary structure adapted to provide the necessary casing or frame for the electric motor which operates the car, and to provide also for supporting the axle or axles which in turn support the truck from the track. It therefore follows that in my improved truck the elements which perform the function of supporting the car body do not have to be designed and arranged with reference to supporting the motor frame or casing, as the motor frame or casing itself serves in part as a truck frame and imparts strength thereto, as distinguished from being supported from a truck frame designed with reference to supporting both the car body and the motor casing or frame. A combined motor casing and truck frame constructed in accordance with my invention is therefore much lighter than is the case where a truck frame is first provided for supporting both the car body and the motor frame or casing, and, in cases where the motor and truck frames are formed for the most part as a single casting, as in the preferred embodiment of my invention, the structure as a whole is much simpler and is made up of fewer parts than is the case where a truck frame is first provided, and a motor casing subsequently secured thereto and supported from said frame.

With the above and other objects of invention in view, my invention consists in the improved combined motor casing and truck frame illustrated in the accompanying drawings and hereinafter described and claimed, and in such variations and modifications thereof as will be obvious to those skilled in the art to which my invention relates.

Figure 2:
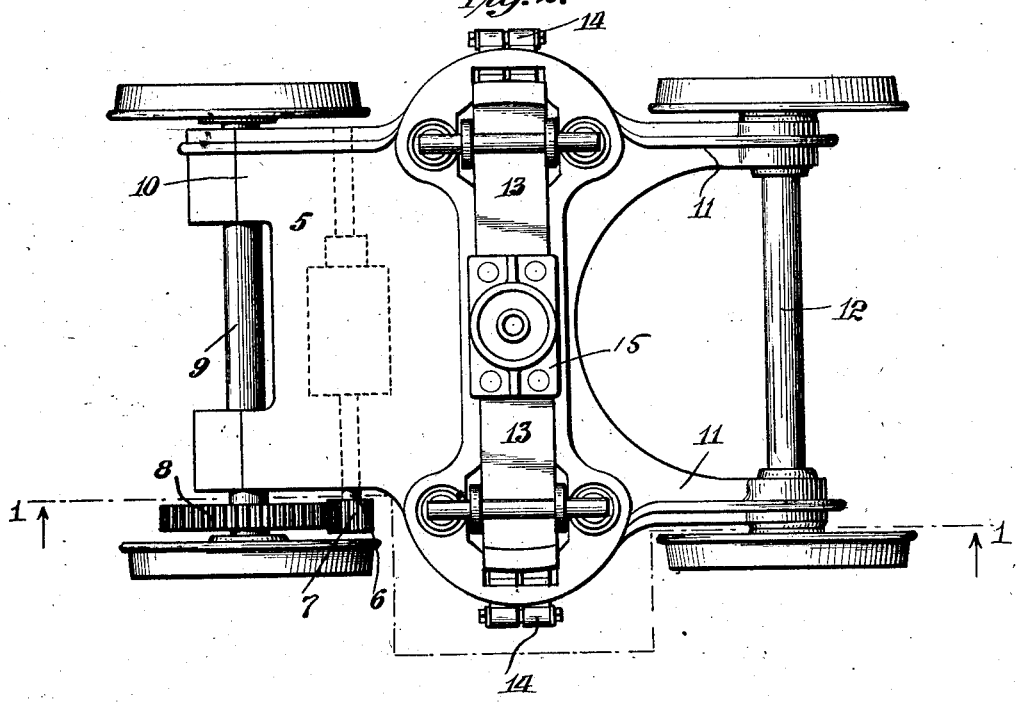
Figure 3:
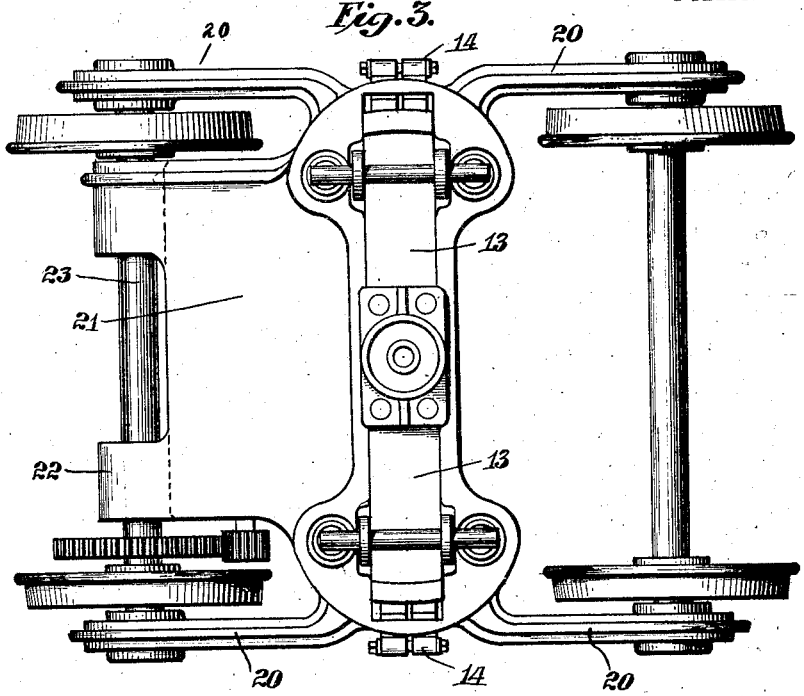
Figure 4:
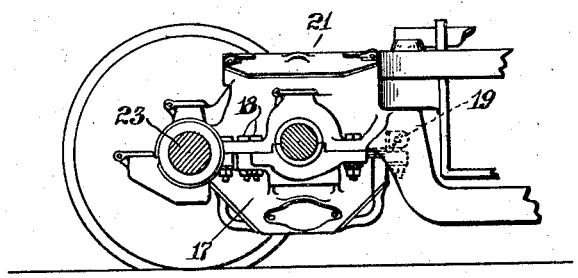

In the drawings, Figure 1 is a view showing one form of my improved combined motor casing and truck frame in side elevation, the same being taken upon a plane indicated by the line 1—1, Fig. 2; Fig. 2 is a view showing the same in plan; Fig. 3 is a view showing a slightly modified form of my improved combined motor casing and truck frame; and, Fig. 4 is a fragmentary view showing a further modification thereof.

In the drawings, and referring first to Figs. 1 and 2, these views show a combined motor casing and truck frame formed as a single integral casting and having a portion 5 which forms the frame or casing for the electric motor which drives the car, the same being provided with suitable poles as will be understood to thereby provide a field for the motor. The armature of the motor is indicated in dotted lines, and the shaft 6 thereof is provided with a pinion 7 adapted to mesh with the gear 8 secured to the driving axle 9 of the truck. The portion 5 of my improved combined motor casing and truck frame above referred to is provided with arms 10 adapted to support journal boxes, which in turn support the driving axle 9 as will be understood, and with other arms 11 adapted to support a second axle 12, the combined motor casing and truck frame illustrated being one in which two parallel axles are provided. A suitable bolster 13 is carried by the combined motor casing and truck frame and which bolster in turn supports one end of a car body. The bolster illustrated is of the type commonly referred to as a swinging bolster, and the same is shown as supported by two separate springs 14 located one at each of its ends, and which springs are in turn supported from the combined casing and frame, as will be understood; the combined motor casing and truck frame considered as a whole being so formed that the springs in question are located wholly or for the most part below the upper surface thereof in order that the bolster itself, and the bolster plate 15 carried thereby, will extend a minimum distance above the casing and frame, from which it follows that the car body will be supported as close to the truck as practicable. It will be understood, however, that a bolster other than of the swinging type may be employed so long as the spring or springs which support the same are in turn so supported from the combined casing and frame that the car body will be supported close to the upper side of the truck. It will thus be seen that the portion of my combined motor casing and truck frame which provides the frame or casing 5 for the driving motor forms a massive strengthening element for the entire truck and from which the arms 10 extend; and from which also the portion of the combined casing and frame which supports the bolster, and the arms 11 also project; the whole being designed and arranged with reference merely to supporting the weight of the car and not with reference to supporting the driving motor in addition to the weight of the car; as is the case where a supporting truck frame is designed with reference to supporting a motor which in itself contributes no strength to the truck as a whole.

In the form of my invention shown in Fig. 1, the motor frame or casing is provided with a spider at each side thereof, one of which is shown at 16, the purpose of which construction is to permit the armature of the motor to be removed from the field by a transverse or sidewise movement thereof. In the form of my device shown in Fig. 4, however, a portion 17 of that part of the combined motor and truck frame which provides the field for the motor is made removable, so that upon loosening the bolts 18, the portion 17 may be swung downward about a hinge 19 and the armature of the motor thus removed by a downward as distinguished from a transverse movement.

The form of my invention shown in Fig. 3 differs from the form shown in Figs. 1 and 2 in that arms 20 are provided which support journal bearings located outside of the truck wheels instead of inside. In this form of my invention, while I have shown the portion 21 of a combined motor casing and truck frame which forms the field magnets of the motor as provided with arms 22, these arms may, if desired, be omitted, in which case the weight of the car body is borne by the arms 20, and the outer portion of the motor field is unsupported. When used, the arms 22 provide an additional bearing for the driving axle 23 of the truck and a support for the free outer portion of the field magnets, thus providing a more rigid structure and strengthening the combined motor casing and truck frame as a whole.

In the drawings, while I have illustrated a truck as provided with a single driving motor, it will be understood that my invention contemplates and includes also a combined motor casing and truck frame in which provision is made for two driving motors, one to drive each axle of the truck.

Having thus described and explained my invention, I claim and desire to secure by Letters Patent:

1. In a motor truck for electric railways, a combined motor casing and truck frame formed as a single unitary structure and having bearings adapted to receive a supporting axle, spring supported from and the lower ends of which lie below the upper surface of said combined casing and frame, and a bolster supported by said springs.

2. In a motor truck for electric railways, a combined motor casing and truck frame formed integral with one another and having bearings adapted to receive a supporting axle, springs supported from and the lower ends of which lie below the upper surface of said combined casing and frame, and a bolster supported by said springs.

3. In a motor truck for electric railways, a motor frame or casing having arms so arranged as to support two parallel axles of the truck, and bolster supporting means located between said axles and below the upper surface of said frame or casing.

4. In a motor truck for electric railways, a motor frame or casing having arms formed integrally therewith and so arranged as to support two parallel axles of the truck, ond bolster supporting means located between said axles.

Signed at New York borough of Manhattan in the county of New York and State of New York this 17th day of January A. D. 1913.

WARREN L. BOYER.

Witnesses:
MARY B. JUSTICE,
R. N. FLINT.

---

Copies of this patent may be obtained for five cents each, by addressing the "Commissioner of Patents, Washington, D. C."